Patented Oct. 26, 1937

2,097,230

UNITED STATES PATENT OFFICE 2,097,230

CHOCOLATE MILK BEVERAGE AND PROCESS

Howard J. Lucas, Pasadena, Calif., assignor to Kelco Company, Los Angeles, Calif., a corporation of Delaware No Drawing. Original application July 2, 1934, Serial No. 733,530. Divided and this application September 25, 1936, Serial No. 102,615

25 Claims. (Cl. 99—25)

This invention is a novel non-settling chocolate milk beverage and process of producing same, and the principal object is to produce such beverage by incorporating therein an alginate compound which is readily soluble in milk. The present application is a division of my copending application Serial No. 733,530, filed July 2, 1934.

All alginates heretofore made, to the best of my knowledge and information, have been insoluble in milk or products containing milk. This is especially true of the high viscosity alginates, even when mixed with a fairly large percentage of sugar and dried. Heretofore such alginates, or mixtures thereof, although finely ground will not completely dissolve when added to milk, at room temperature, at 180° F., or at intermediate temperatures, but the alginates remain suspended in the form of distinctly visible particles even after long and vigorous stirring. Consequently when such alginates were used in dairy products, it was necessary to first prepare a water solution of the alginate and add this to the milk. Thus in using alginates in chocolate milk drinks, the alginate had to be first dissolved in water, then cocoa added, and then the other ingredients such as sugar, malt, flavoring, etc., to make a syrup, and then add such syrup to the milk in the proportions desired. The necessity for first making water solutions of the alginates not only involved expense and time in preparing the final drink, but in some cases the water affected the quality; and special equipment was involved, and many dairies lacking such equipment have been unable to use alginates for the above reasons.

My novel product more specifically consists of a relatively dry soluble alginate compound which may be dissolved directly in milk, or products containing milk, without preliminary dissolving in water or special handling such as heretofore required; and without any special equipment; and solutions of my novel product in milk can be made in the usual pasteurizing vats.

One practical method of manufacturing my novel milk soluble alginate compound is as follows: A quantity of alginic acid (preferably such as disclosed in Thornley-Walsh Patent No. 1,814,981, dated July 14, 1931; and Clark-Green Patent No. 2,036,922, dated April 7, 1936; and Green Patent No. 2,036,934, dated April 7, 1936, which usually contains about 85% to 90% water and has a fibrous character) is placed in a suitable mixer.

Enough soda ash is then added to the alginic acid to produce when thoroughly mixed therewith, a sodium alginate paste of about 7 pH. Preferably the soda ash is dusted into the mixer to aid in uniformly distributing it throughout the mass. In place of soda ash other neutralizing agents, such as sodium bicarbonate and sodium hydroxide may be used. The mixing is continued long enough (usually about 20 minutes) to insure conversion of all the alginic acid into a sodium alginate paste.

To this paste is then added a phosphate (preferably trisodium phosphate) or similar material. The anhydrous weight of such trisodium phosphate is approximately equal to ⅛ of the anhydrous weight of the alginic acid. This trisodium phosphate is added in dry form ($Na_3PO_4.12H_2O$ or $Na_3PO_4.H_2O$) and mixed into the paste until it has thoroughly dissolved and reacted; this ordinarily occurs in about ten minutes' time. When milk powder or other suitable drying agent is employed, it is added in a similar manner to the phosphate. When sugar, or other suitable agent for increasing solubility and for controlling the colloidal efficiency of the product, is used, it is added in a similar manner to the phosphate.

The resultant mixture is then dried by any suitable well known method. It may be spread onto trays and dried in the sun in one to three days' time, depending on weather conditions. It may be dried artificially by means of a drum dryer, spray dryer, mechanical tray belt tunnel dryer, or other suitable means. In some cases it has been found desirable to add milk powder to this mixture to assist in drying during the manufacture of the dry soluble compound. The addition of milk powder or other suitable agent to the mixture before drying greatly assists the drying.

The dried material, which may contain about 10-15% water, is then ground and screened to a convenient size for marketing. The product may be of any suitable size. Preferably the dried material is reduced to a size which will pass through a 20 mesh screen and over an 80 mesh screen. The smaller the particle size the faster the solution rate when the particles are dispersed in milk. As too fine particles may tend to cake prior to use, I usually remove the finest particles (at present those which pass through an 80 mesh screen) and place them in the mixer with the alginic acid and soda ash in the initial step of preparing more of my product; this disposes of such fines and they aid in thickening the paste so that it will dry faster.

For a thoroughly milk soluble alginate the pH of the finished product in a 1% water solution would preferably be above 7.5; and the more the pH increases the quicker the product will go into solution in milk.

I have found that a mechanical mixture of dry sodium phosphate and dry sodium alginate will not give the same result in that it will not dissolve in milk even though such ingredients were first finely ground and intimately mixed together; and also that the addition of dry sugar to said mixture will not render it soluble in milk.

Chocolate milk drinks may be prepared by adding my novel soluble alginate compound to the milk in the pasteurizing vat and stirring the mixture while heated to pasteurizing temperature until the alginate is dissolved; then the desired amount of cocoa is added, and finally the sugar and other ingredients are added and thoroughly mixed. Stirring at pasteurizing temperatures or higher until the alginate compound is dissolved will give satisfactory results. At least pasteurizing temperatures are necessary to dissolve the alginate I employ in the milk in ordinary pasteurizing vats, but higher dissolving temperatures may be used. After the pasteurization and mixing are completed, the drink may be cooled, held if desired, and bottled in the usual manner.

While normal pasteurizing temperatures are usually sufficient to dissolve the alginate compound, it is desirable to use a temperature of about 160° F. to insure quick and complete solution. I do not restrict myself to such temperature because some batches may be soluble at lower temperatures.

The above described process may be varied as follows and still give a milk soluble alginate compound: Refined alginic acid made by any process may be used. The salts of the alginic acid may have high or low viscosity, although a greater suspending power towards cocoa is obtained when a high viscosity alginic acid is used. The acid does not have to be free of all insoluble alginic acid salts such as calcium or aluminum salts, as such salts will react with the trisodium phosphate to form the corresponding insoluble phosphate and soluble sodium alginate. The effectiveness of high-ash alginic acid is increased by the addition of the trisodium phosphate.

A soluble alginate such as ammonium, potassium or magnesium alginate, or any other suitable water soluble alginate, or any combination of these, may be incorporated in a paste form with trisodium phosphate to obtain the milk soluble phospho-alginate compound. When soluble alginates other than sodium alginates are to be incorporated, the corresponding carbonates, bicarbonates or hydroxides may be added for neutralizing the alginic acid.

In place of trisodium phosphate other phosphates may be used, such as disodium phosphate, monosodium phosphate, or combinations of these. Phosphoric acid also may be used, or any combination of it with the above salts. Soluble phosphates other than those of sodium may also be used. Sodium hydroxide or other strongly basic substance may also be used in conjunction with these compounds in order to bring the pH to the desired value. In such case the phosphates may be added to the alginic acid before the carbonates. The sodium hydroxide or other strongly basic substance may be added previous to, during and/or subsequent to the incorporation of the phosphoric compound with the alginic compound.

It must be remembered, however, that the ratio of the amount of substitutes used for trisodium phosphate will necessarily have a different effective minimum ratio to the alginic acid content than the trisodium phosphate. The substitution may be complete or partial or made with several different substitutes.

The product may be a sodium phospho-alginate, or as hereinafter described may consist of a compound of sodium alginate and the sodium salt of an acid whose calcium salt is insoluble in water, such as sodium silicate, sodium citrate, sodium tartrate, sodium carbonate, sodium caseinate, according to the specific chemicals employed. In lieu of the sodium compounds mentioned above, the corresponding potassium and ammonium salts and other water soluble edible salts which do not form a precipitate with sodium alginate may be used.

My new product is not only superior to sodium alginate in its solubility in milk, but also increases the effectiveness of the contained sodium alginate in its ability to suspend cocoa. I have demonstrated this by the following test: A sodium alginate and sugar mixture was made and dried; also a phospho-alginate was made from the same lot of alginic acid. These two products were then dried, ground and used to make a non-settling chocolate milk drink. In the one containing phospho-alginate 20% less alginate was required to suspend the cocoa than was required with the sodium alginate-sugar. When a chocolate milk was made by suspending cocoa in milk in which phospho-alginate had previously been added without first dissolving it in water, 27% less alginate was required than in a chocolate milk where the alginate-sugar mixture was first dissolved in water. The alginate-sugar mixture could not be tested directly in milk as it would not dissolve therein.

Any form of drying could be used; the methods commonly used for this purpose are spray drying and drum drying. In each of these cases the resulting dry product will be stabilized when reconstituted in water or milk. Due to the small amount of the new product required in commercial use and to the buffer effect of milk, the pH of the milk after the new product is in solution is substantially unchanged.

To the various grades of reconstituted milk containing my milk soluble product can be added cocoa or chocolate and sugar to form a completely suspended chocolate milk.

My new milk soluble alginate product may be added dry, or in the form of a water solution, to chocolate liquor or a water solution of cocoa either during the processing of the cocoa, or to a reconstituted water solution of finished cocoa; and these wet mixtures can be dried to produce a dry non-settling cocoa powder; such powder can be added to water and sugar to form a non-settling syrup which can be added to milk to form a non-settling chocolate milk; or such powder can be added to hot milk and sugar to form a non-settling chocolate milk without the necessity of first going through the step of making a syrup.

Another characteristic by which my new milk soluble product differs from sodium alginate, or mixtures of sodium alginate and sugar, is that it can be mixed with sugar, cocoa, chocolate and flavoring in dry form to produce a compound which when added to hot milk will make a non-settling chocolate milk drink. Such compound could first be added to water to form a syrup if desired, which syrup could be added to hot milk to form a non-settling drink. Dry milk powder of any butter fat content could be added to the aforesaid compound, and by adding such mixture to water a non-settling chocolate milk can be produced. So far as I am advised or can ascertain no suspending agent or stabilizer ever before known could be used as hereinbefore described to produce a non-viscous non-settling chocolate milk.

I claim:

1. A non-settling chocolate milk beverage comprising milk, cocoa, and a milk soluble phospho-alginate compound.

2. A non-settling chocolate milk beverage comprising milk, cocoa, and a milk-soluble alginate compound comprising an edible water soluble salt of alginic acid and an edible water soluble salt of an acid whose calcium salt is insoluble in water.

3. A non-settling chocolate milk beverage comprising milk, sugar, cocoa, and a milk soluble alginate compound comprising sodium alginate and the sodium salt of an edible acid whose calcium salt is insoluble in water.

4. A non-settling chocolate milk beverage comprising milk, sugar, cocoa, and a milk soluble alginate compound comprising an edible water soluble alginate and trisodium phosphate.

5. A non-settling chocolate milk beverage comprising milk, sugar, cocoa, and a milk soluble alginate compound comprising an edible water soluble salt of alginic acid and sodium phosphate, and having a pH of over 7.5.

6. A non-settling chocolate milk beverage comprising milk, sugar, cocoa, and a milk soluble alginate compound comprising an edible water soluble salt of alginic acid and trisodium phosphate, and having a pH of over 7.5.

7. A non-settling chocolate milk beverage comprising milk, sugar, cocoa, and a milk soluble alginate compound comprising an edible water soluble alginate and sodium caseinate.

8. A chocolate milk powder comprising a mixture of sugar, cocoa, and an edible milk soluble phospho-alginate.

9. A powder for use in making chocolate milk comprising a mixture of sugar, cocoa, milk powder and a milk soluble alginate compound comprising an edible water soluble salt of alginic acid, and sodium phosphate, and having a pH of over 7.5.

10. A powder for use in making chocolate milk comprising a mixture of sugar, cocoa, and a milk soluble alginic compound comprising sodium alginate and trisodium phosphate.

11. The herein described process of producing a powder for use in making chocolate milk, consisting in mixing water, alginic acid, a suitable neutralizing agent to produce an edible water soluble salt of alginic acid, an edible water soluble phosphate, and cocoa, agitating the mixture until it is converted into a paste, drying the mixture and comminuting the dried product.

12. The herein described process of producing chocolate milk powder, consisting in mixing water, alginic acid, sodium carbonate, trisodium phosphate, sugar and cocoa, agitating the mixture until it is converted into a paste, drying the mixture, and comminuting the dried material.

13. The herein described process of producing a powder for use in making chocolate milk, consisting in mixing a dry, edible, milk soluble phospho-alginate compound with cocoa and sugar.

14. A chocolate milk powder comprising a mixture of sugar, cocoa, milk powder and a milk soluble alginic compound comprising an edible water-soluble alginate and an edible water-soluble phosphate.

15. A non-settling chocolate beverage comprising chocolate liquor, and a mixture of sugar and a milk soluble edible phospho-alginate compound.

16. For use in making a non-settling cocoa beverage; a powder consisting of a mixture of sugar and a milk soluble edible phospho-alginate compound.

17. A non-settling chocolate milk composition comprising milk, cocoa, and a milk-soluble alginate compound comprising an edible water soluble salt of alginic acid and an edible water soluble salt of an acid whose calcium salt is insoluble in water.

18. A non-settling chocolate milk beverage comprising milk, chocolate liquor, sugar, and a milk soluble alginate compound comprising an edible water soluble salt of alginic acid and an edible water soluble salt of an acid whose calcium salt is insoluble in water.

19. A powder for use in making chocolate milk comprising a mixture of sugar, cocoa, milk powder and an edible milk soluble alginate compound comprising an edible water soluble salt of alginic acid and an edible water soluble salt of an acid whose calcium salt is insoluble in water.

20. The herein described process of producing non-settling chocolate milk beverage consisting in pasteurizing milk, dissolving a milk soluble alginate compound therein during pasteurization, said compound comprising an edible water soluble salt of alginic acid and an edible water soluble salt of an acid whose calcium salt is insoluble in water; adding cocoa and sugar to such pasteurized milk; and cooling the same.

21. The herein described process of producing non-settling chocolate milk beverage consisting in pasteurizing milk, dissolving a milk soluble alginic compound in the milk during pasteurization, said compound comprising an edible water soluble salt of alginic acid and an edible water soluble salt of an acid whose calcium salt is insoluble in water; adding chocolate liquor and sugar; and cooling the same.

22. A chocolate milk powder comprising a mixture of sugar, cocoa, milk powder, and a milk soluble edible alginic compound comprising an edible water soluble salt of alginic acid and an edible water soluble salt of an acid whose calcium salt is insoluble in water.

23. A non-settling cocoa beverage comprising a water solution of cocoa and a mixture of sugar, milk powder, and a milk soluble edible alginic compound comprising an edible water soluble salt of alginic acid and an edible water soluble salt of an acid whose calcium salt is insoluble in water.

24. The herein described process of producing a milk soluble powder for use in making chocolate milk; consisting in mixing a milk soluble edible alginate product comprising an edible water soluble salt of alginic acid and an edible water soluble salt of an acid whose calcium salt is insoluble in water, with a chocolate liquid preparation, drying the mixture; and comminuting the dried material.

25. The herein described process of producing a milk soluble powder for use in making chocolate milk; consisting in mixing a milk soluble edible alginate product comprising an edible water soluble salt of alginic acid and an edible water soluble salt of an acid whose calcium salt is insoluble in water, with a water solution of cocoa; drying the mixture; and reducing same to a powder.

HOWARD J. LUCAS.